(12) United States Patent
Grone

(10) Patent No.: US 7,715,161 B2
(45) Date of Patent: May 11, 2010

(54) DEVICE FOR STORING ELECTRICAL ENERGY

(75) Inventor: Christian Grone, Neustadt (DE)

(73) Assignee: Sennheiser Electronic GmbH & Co. KG, Wedemark (DE)

( * ) Notice: Subject to any disclaimer, the term of this patent is extended or adjusted under 35 U.S.C. 154(b) by 72 days.

(21) Appl. No.: 11/181,095

(22) Filed: Jul. 13, 2005

(65) Prior Publication Data

US 2006/0017425 A1    Jan. 26, 2006

(30) Foreign Application Priority Data

Jul. 13, 2004    (DE) .................... 10 2004 034 028

(51) Int. Cl.
*H02H 3/00* (2006.01)
*H04R 25/00* (2006.01)
(52) U.S. Cl. ........................ 361/87; 381/370
(58) Field of Classification Search ............ 361/87; 381/370
See application file for complete search history.

(56) References Cited

U.S. PATENT DOCUMENTS

| | | | | |
|---|---|---|---|---|
| 3,940,701 | A * | 2/1976 | Novitski | 455/352 |
| 6,014,345 | A * | 1/2000 | Schmadeka | 368/10 |
| 6,104,009 | A * | 8/2000 | Man | 219/492 |
| 6,704,427 | B2 | 3/2004 | Wurtz | |
| 2005/0013447 | A1 * | 1/2005 | Crump et al. | 381/71.6 |
| 2005/0249355 | A1 * | 11/2005 | Chen et al. | 381/71.14 |

FOREIGN PATENT DOCUMENTS

| | | |
|---|---|---|
| DE | 40 19 059 | 12/1991 |
| EP | 1 499 017 | 1/2005 |
| GB | 2 245 781 | 1/1992 |

* cited by examiner

*Primary Examiner*—Robert DeBeradinis
*Assistant Examiner*—Scott Bauer
(74) *Attorney, Agent, or Firm*—Frommer Lawrence & Haug LLP

(57) ABSTRACT

The invention relates to a device consisting of a storage device for storing electrical energy. This may, for example, be a battery, an accumulator or another electrical storage device, for example a capacitor (double-layer capacitor). In the present application, the object is now pursued of keeping the consumption of electrical energy as low as possible, to economize relative to previous solutions and to bring about a great simplification from the point of view of manufacturing. Device consisting of a storage device for storing electrical energy, a device for monitoring the output current from the storage device and a controllable switch, by means of which the current output can be interrupted, wherein the switch is opened and the current output is therefore interrupted, when the device for monitoring the output current detects that for a predetermined time, for example, 30 seconds to 2 minutes, a predetermined current characteristic is present, for example, the output current does not fluctuate, or only extremely slightly.

5 Claims, 3 Drawing Sheets

DEVICE FOR STORING ELECTRICAL ENERGY

CROSS-REFERENCE TO RELATED APPLICATION

This application claims priority of German Application No. 10 2004 034 028.5-34, filed Jul. 13, 2004, the complete disclosure of which is hereby incorporated by reference.

BACKGROUND OF THE INVENTION a) Field of the Invention

The invention relates to a device consisting of a storage device for storing electrical energy. This may be, for example, a battery, an accumulator or another electrical storage device, for example a capacitor (double-layer capacitor).

b) Description of the Related Art

Electrical storage devices of this type regularly have an output for outputting the stored electrical energy.

Storage devices of this type may either be installed in apparatuses, for example in radios, headsets, MP3 players and the like, in other words, for example, in portable apparatuses for entertainment electronics, or electrical storage devices of this type form an independent unit (for example a battery pack) and this can then be coupled, plugged together, rigidly connected or the like, with the apparatus to be supplied with electrical energy. The coupling regularly takes place here via plugs, the storage unit having a plug, which cooperates with a corresponding mating component, for example a coupling or a corresponding mating plug of the electrical apparatus so that this apparatus can be supplied with the desired electrical energy.

U.S. Pat. No. 6,704,428 B1 is known as the related art. DE 4,019,059A1 and EP 1,499,017A2 are also known as related art. A battery module is also known, which is also suitable for a headset system with active sound suppression, from the company David Clark Company Incorporated. This battery module is provided, according to the operating instructions, with an "auto-shut-off function", which saves the battery when the system is switched on but the headset is not being used. In this case, a check is obviously made as to whether the microphone DC base voltage is still present when the headset is connected or the audio system is switched off.

OBJECT AND SUMMARY OF THE INVENTION

In the present application, the primary object is directed to keeping the consumption of electrical energy as low as possible, to economizing relative to previous solutions and to bringing about a great simplification from the point of view of manufacturing.

The object is achieved with a device in accordance with the invention comprising a storage device for storing electrical energy, a device for monitoring the output current from the storage device and a controllable switch by which the current can be interrupted. The switch is adapted to being opened and the current output being therefore interrupted, when the device for monitoring the output current detects that for a period of time, a predetermined current characteristic is present, such as when the output current does not fluctuate, or only extremely slightly.

A particular advantage of the solution according to the invention lies in the fact that the power supply is interrupted when a certain current characteristic of the output current is detected.

Precisely this current characteristic is namely monitored, and specifically in the current output of the electrical storage device, and when a preset current characteristic is detected, the current output is interrupted by the controllable switch, so that an apparatus connected to the device according to the invention is uncoupled from the power supply.

A particular aspect of the invention consists in that an energy function is produced without any change having to be made to the apparatus itself that is connected to the storage device.

In the invention, the output current, in other words the current from the electrical storage device is monitored and as long as this output current exceeds a specific value and/or exceeds a specific fluctuation value, the connected apparatus is supplied with electrical energy.

If the current monitoring device now detects that the current fluctuation falls below a specific threshold value and/or the current output on average falls below a specific value, a timer function is started and when the state triggering the timer function, in other words, the falling below state described above, is sustained over a predetermined time period, for example 30 sec., 1 min., 1½ min., 2 min. etc., the power supply, in other words, the current output, is interrupted by the controlled switch.

The timer function can preferably also be individually set by the user and when, after the start of the timer function, but before the triggering of the switch function (interruption), a current characteristic lying outside the switching criteria is again reached, the timer function is then restarted if the fluctuation values or the absolute values of the mean current consumption fall below the predetermined values.

The invention will be described in more detail hereinafter with the aid of an embodiment:

DESCRIPTION OF THE PREFERRED EMBODIMENTS

Figure 1:
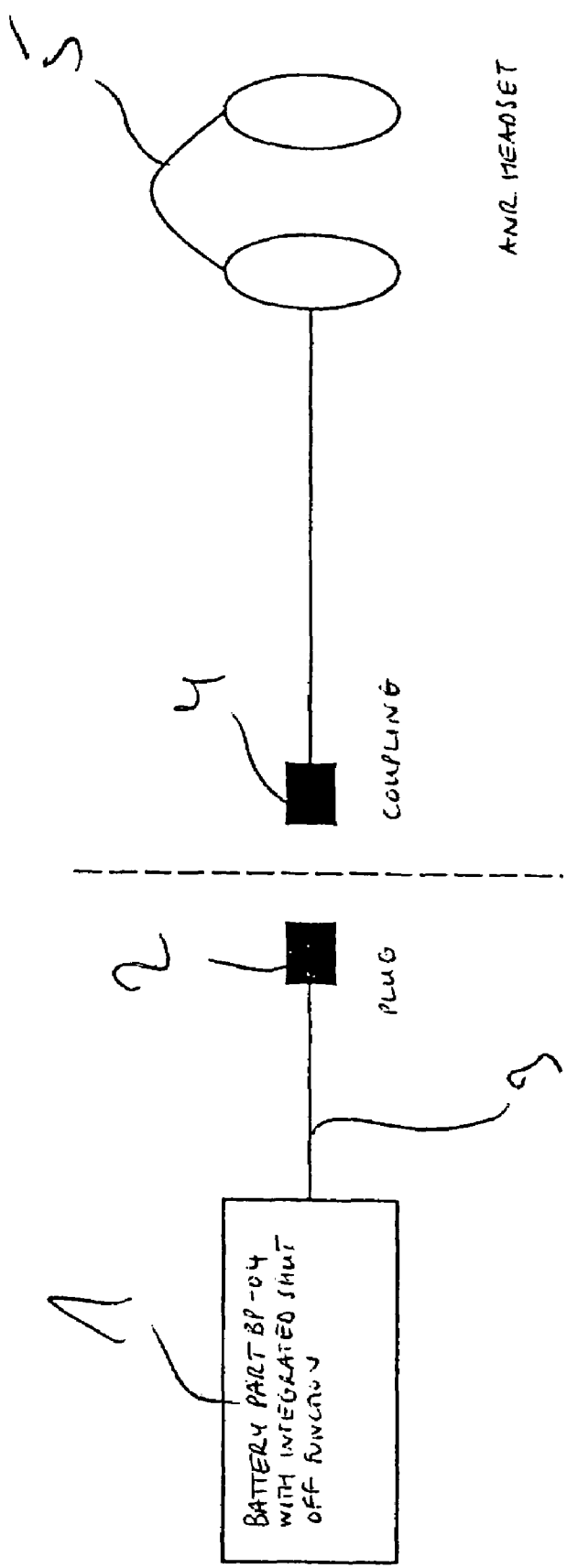
FIG. 1 shows a headset with active sound suppression with a battery supply module according to the invention.

FIG. 1 shows a module 1 (or unit) consisting of an electrical storage device in the form of a battery and an auto-switch-off function integrated therein and, at the output 2 of this module, a plug is provided, which is connected to the output via a line 3.

This plug fits together with a coupling 4 or a corresponding mating plug of a known headset 5 with active sound suppression (hereinafter called an ANR headset).

It is also possible, however, to connect any other apparatus to the supply module inasmuch as this is possible by means of a corresponding coupling and plug connection.

The above-described auto-switch-off function is to prevent unnecessary energy from the electrical storage device, in other words battery energy, being used (wasted), for example when the user forgets to switch off when not using the connected electrical apparatus, in other words, in this case, the ANR headset 5.

Figure 2:
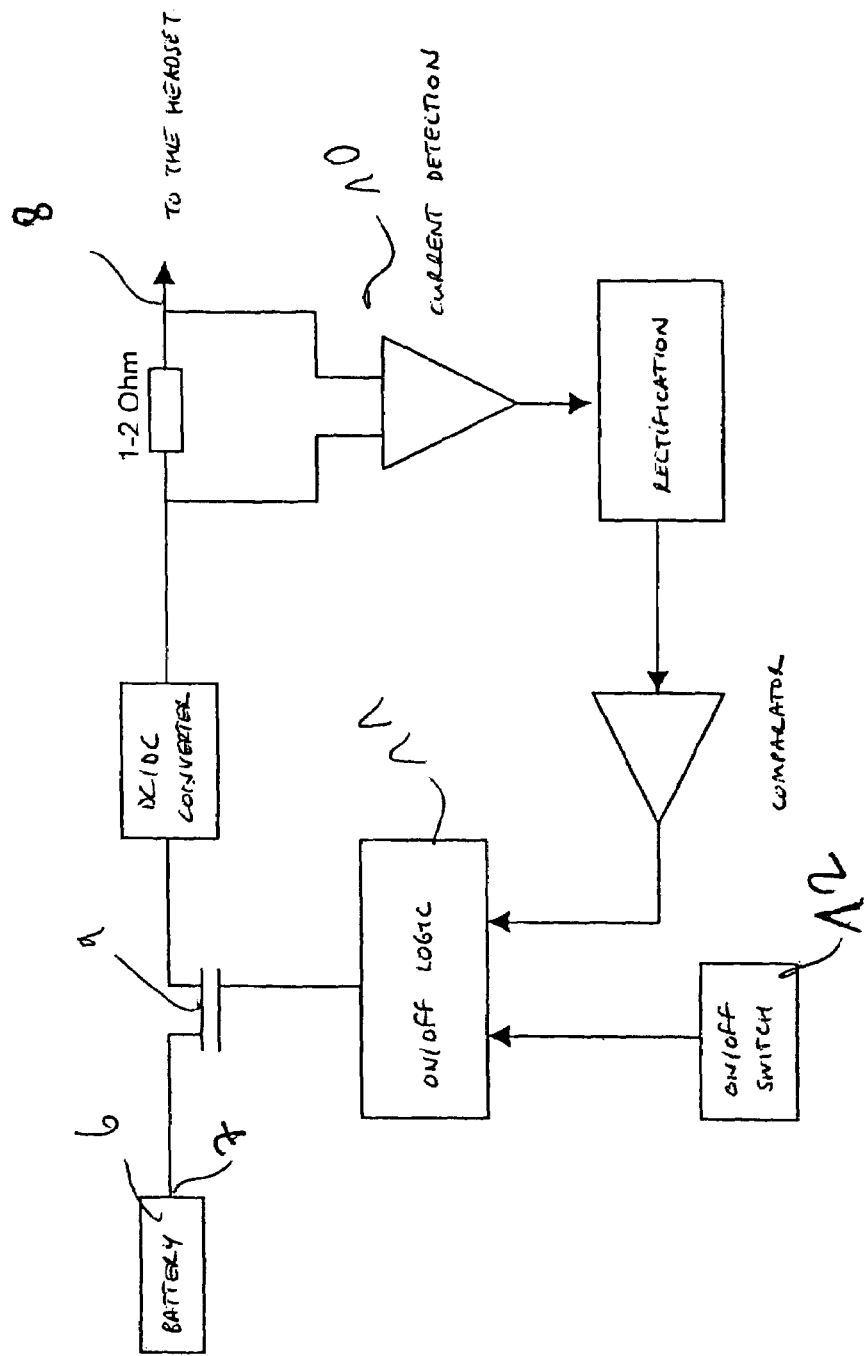
FIG. 2 shows a block diagram of the battery supply module.

FIG. 2 now shows the embodiment of module 1 according to the invention.

It can be seen here that a current output 8 is formed at the output 7 of the battery 6 and, in its path, a controllable switch 9 is installed and the output current in the current output is simultaneously monitored via a current detection device 10 and the current detection device is connected to the switch 9 via an on/off logic 11 as the control device.

The entire electronics for monitoring the current, and also the other components, draw their energy supply from the battery.

If the connected electrical apparatus now has a current consumption in which the current fluctuations are only extremely slight, in other words it falls below a predetermined threshold value, for example a threshold value of 30 mA (plus/minus 10 mA) this is correspondingly recorded by the current monitoring device and a conclusion is drawn from this by a comparison with a correspondingly predetermined value. If, for example, the current fluctuation is below a predetermined threshold value, and this can easily be detected by a simple comparison with the threshold value, a switching signal is generated, which leads to the circuit interruption of the switch 9 and therefore to the interruption of the entire current output.

So that an interruption is not brought about immediately when the threshold value is briefly fallen below, measurement of the predetermined current fluctuation values that fall below the threshold is also linked to a time measurement (in the logic 11) and this can be embodied by a simple timer function.

If the predetermined threshold value of the current fluctuation is fallen below for a predetermined time period for example, 30 sec., 1 min., 2 min., 5 min. etc.—in other words during a predetermined time segment—then after expiration of this time segment, and if the threshold value is simultaneously fallen below over the entire time, the current is interrupted.

Alternatively, but also as a supplement to the previously described solution, the absolute current consumption (mean value) or the energy consumption can be simultaneously measured and when this consumption value, for example measured over one minute, falls below a specific predetermined threshold value of the absolute current consumption (mean value), for a specific, in turn predetermined time, this triggers a corresponding switch-off signal and therefore the interruption of the switch.

Figure 3:
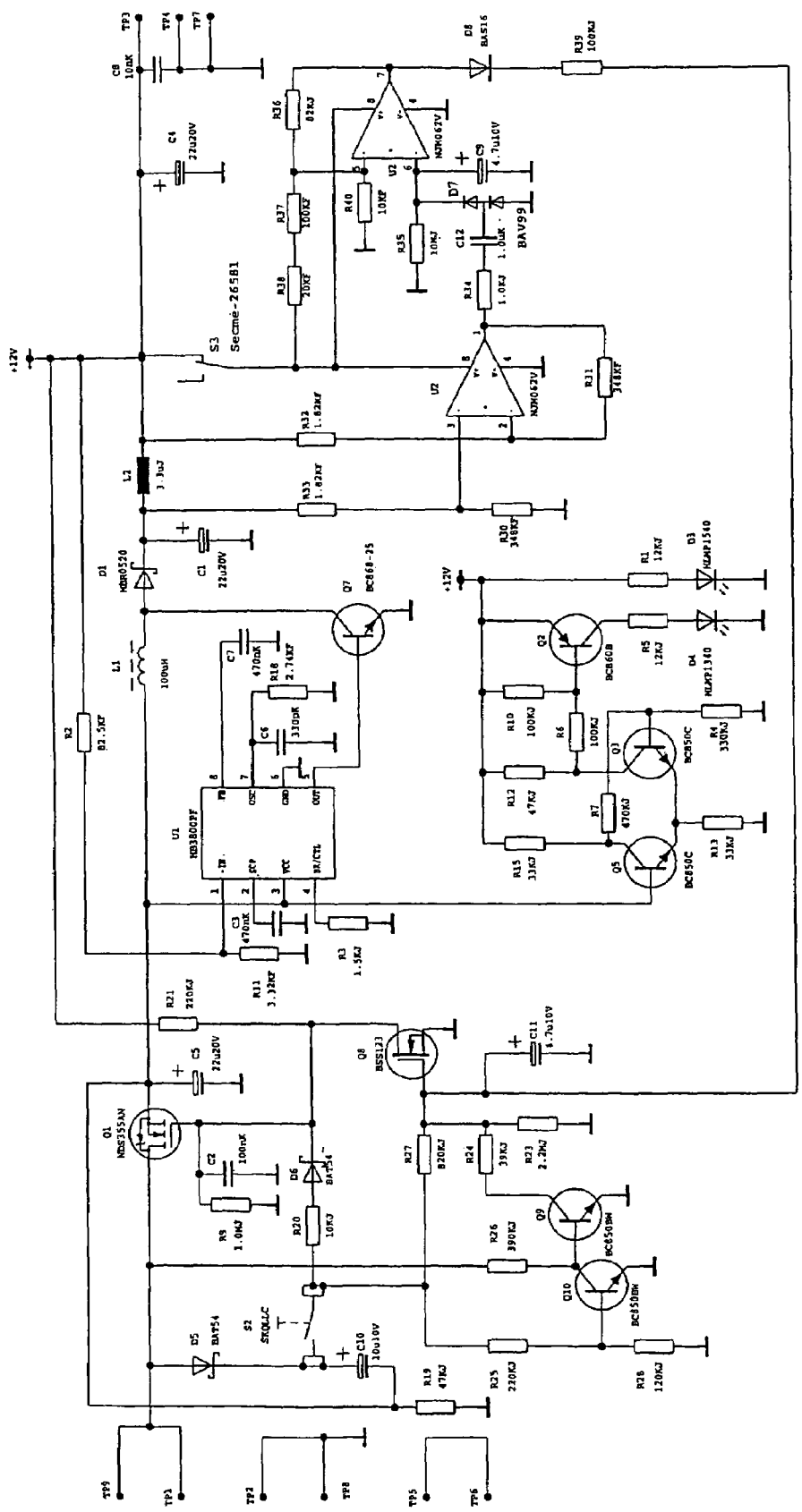
FIG. 3 shows a precise circuit embodiment of the battery supply module.

As is also shown in the drawing of FIG. 3 by a corresponding switch S3, the auto-shut-off function can be switched off, so the power supply—even when the above-described threshold values are fallen below—is not interrupted. Furthermore, the entire power supply of the battery can be switched on or off by a switch 12 (FIG. 2).

If an ANR headset is connected, the wearing and use of a closed headset of this type leads to excessive sound pressure fluctuations at the headset earpieces, caused by head and jaw movements. The ANR system attempts to compensate these sound pressures and therefore the operation, in other words the functioning of the active sound suppression, can be detected with the aid of the current consumption. Therefore, if the current fluctuation of the current consumption is extremely low, according to the invention it is concluded therefrom that the ANR headset system as a whole is not in use, because it is improbable in normal life experience that when the system is in use itself and is worn over a certain period, no fluctuations occur.

FIG. 3 shows a precise embodiment (normal mode) of the electronics of the electric storage device.

In FIG. 3, only the current fluctuations are allowed through via the diodes D7 and the capacitor C9/resistor R35, so this leads to the fact that the capacitor C9 does not discharge when the (total of the) current fluctuations exceeds a certain threshold value. As the capacitor-resistor network (RC member) also constantly discharges over a time constant, constantly adequate current fluctuations must therefore be provided so a specific loading state of the capacitor C9 is not fallen below. The output of the capacitor C9 is connected to the inverting input of the comparator U2 which constantly carries out a comparison of the two input values via its other input. If the preceding threshold value is fallen below at the input 6 of the comparator U2, this leads to a corresponding switching signal being emitted to the transistor Q8 via the output 7, so the entire battery supply is then switched off.

It can be seen that other current characteristics can also be set via a corresponding modified design of D7 or C9 and R35 as well as the comparator U2, in order to nevertheless bring about a switching off operation according to the invention.

Care should be taken in the design that, on the one hand, the switching off criterion is not reached, for example when the design is set too sensitively and the switching off criterion is then frequently achieved and, on the other hand care must be taken in the design, that the switching-off criterion is also reached quickly enough, in other words at least when the apparatus is no longer in use.

The design shown in FIG. 3 assumes that in the case of a mean current consumption of about 30 mA and more, switching off should not occur, but when the closed-circuit current is about 25 mA, switching off is automatically triggered.

As presently stated, the current consumption as such is not absolutely to be regarded as the sole switching off criterion, but rather the current characteristic, in other words the current (dI/dt) or the voltage flow (dU/dt) over time. For example, if the current flow fluctuates only very slightly (for example, one to two percent between the minimum and the maximum amplitude), this is recognized as the switching criterion and leads to the described interruption of the current output.

In the plugs described here, any conventional audio plugs are possible, in particular jack and chinch terminals, in other words also plug connections such as are possible in the case of headsets.

While the foregoing description and drawings represent the present invention, it will be obvious to those skilled in the art that various changes may be made therein without departing from the true spirit and scope of the present invention.

What is claimed is:

1. A device comprising:
   a storage portion for storing electrical energy; and
   an auto-shut-off portion for monitoring an output current from the storage portion and which includes a controllable first switch by which the current output can be interrupted;
   wherein said controllable first switch is adapted to being opened and the current output being therefore interrupted when the auto-shut-off portion for monitoring the output current detects, that for a predetermined time, the current output does not fluctuate or only slightly fluctuates;
   wherein the auto-shut-off portion can be switched off by means of a second switch while continuing to allow power to be provided to an electrical device;
   wherein the auto-shut-off portion further includes a capacitor which determines the predetermined time;
   wherein the auto-shut-off portion further includes:
   a diode;
   a resistor; and
   a comparator with first and second inputs;

wherein current fluctuations are allowed through to the diode, the capacitor, and the resistor of the auto-shut-off portion;

wherein the predetermined time is determined by the capacitor when the current fluctuations decrease to a point so as to fall below a specific threshold value;

wherein an output of the capacitor is connected to the first input of the comparator, the comparator carrying out a comparison of a value received from the first input with the threshold value, which is received from the second input; and wherein a switching-off signal is sent to open the controllable switch when the comparator determines that the value received from the first input is less than the threshold value received from the second input.

2. The device according to claim 1;

wherein said predetermined time is from 30 seconds to two minutes.

3. The device according to claim 1;

wherein the current output is interrupted when no, or only slight, current fluctuations are detected within a minute by the auto-shut-off portion for monitoring the output current.

4. The device according to claim 1;

wherein the current output line is terminated with a plug and said plug is suitable for cooperating with a corresponding coupling or with a mating component of the electrical device.

5. The device according to claim 4;

wherein said plug is suitable for cooperating with an electro-acoustic apparatus such as a headset with active sound suppression.

* * * * *